(12) United States Patent
Gill

(10) Patent No.: US 6,356,419 B1
(45) Date of Patent: *Mar. 12, 2002

(54) ANTIPARALLEL PINNED READ SENSOR WITH IMPROVED MAGNETRESISTANCE

(75) Inventor: Hardayal Singh Gill, Portala Valley, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/359,970

(22) Filed: Jul. 23, 1999

(51) Int. Cl.⁷ .................................................. G11B 5/39
(52) U.S. Cl. ................................................ 360/324.11
(58) Field of Search ..................................... 360/324.11

(56) References Cited

U.S. PATENT DOCUMENTS

| | | | |
|---|---|---|---|
| 4,663,607 A | 5/1987 | Kitada et al. | 338/32 |
| 4,868,698 A | 9/1989 | Takahashi et al. | 360/126 |
| 5,150,511 A | 9/1992 | Sakata et al. | 29/603 |
| 5,227,193 A | 7/1993 | Hori et al. | 427/131 |
| 5,390,061 A | 2/1995 | Nakatani et al. | 360/113 |
| 5,421,915 A | 6/1995 | Nakanishi et al. | 148/304 |
| 5,465,185 A * | 11/1995 | Heim et al. | 360/113 |
| 5,583,725 A * | 12/1996 | Coffey et al. | 360/113 |
| 5,701,223 A * | 12/1997 | Fontana, Jr. et al. | 360/113 |
| 5,726,837 A | 3/1998 | Nakatani et al. | 360/113 |
| 5,843,589 A * | 12/1998 | Hoshiya et al. | 428/692 |
| 6,038,107 A * | 3/2000 | Pinarbasi | 360/113 |
| 6,249,406 B1 * | 6/2001 | Gill et al. | 360/324.11 |

FOREIGN PATENT DOCUMENTS

| | | |
|---|---|---|
| JP | 58-224420 | 12/1983 |
| JP | 59-157825 | 9/1984 |
| JP | 59-231714 | 12/1984 |
| JP | 59-231719 | 12/1984 |
| JP | 60-107714 | 6/1985 |
| JP | 60-193114 | 10/1985 |
| JP | 60-251682 | 12/1985 |
| JP | 61-48114 | 3/1986 |
| JP | 61-104312 | 5/1986 |
| JP | 62-016218 | 1/1987 |
| JP | 60-285530 | 6/1987 |
| JP | 63-058611 | 3/1988 |
| JP | 63-247905 | 10/1988 |
| JP | 63-300418 | 12/1988 |
| JP | 01-143311 | 6/1989 |
| JP | 01-143312 | 6/1989 |
| JP | 5-303724 | 11/1993 |
| JP | 812719 | 5/1996 |

* cited by examiner

*Primary Examiner*—David Davis
*Assistant Examiner*—Angel Castro
(74) *Attorney, Agent, or Firm*—Gray Cary Ware & Freidenrich; Ervin F. Johnston

(57) ABSTRACT

A simple pinned layer or an antiparallel (AP) pinned structure employs a cobalt niobium (CoNb) based layer or film for increasing the resistance of the pinned structure while maintaining a high magnetization ($M_s$). The cobalt niobium (CoNb) based material has sufficient niobium (Nb) to make the material amorphous for increasing the resistance. With this arrangement, less sense current $I_s$ is conducted through the pinned structure which increases signals detected by the spin valve sensor as well decreasing the sense current field on the free layer of the spin valve sensor.

28 Claims, 13 Drawing Sheets

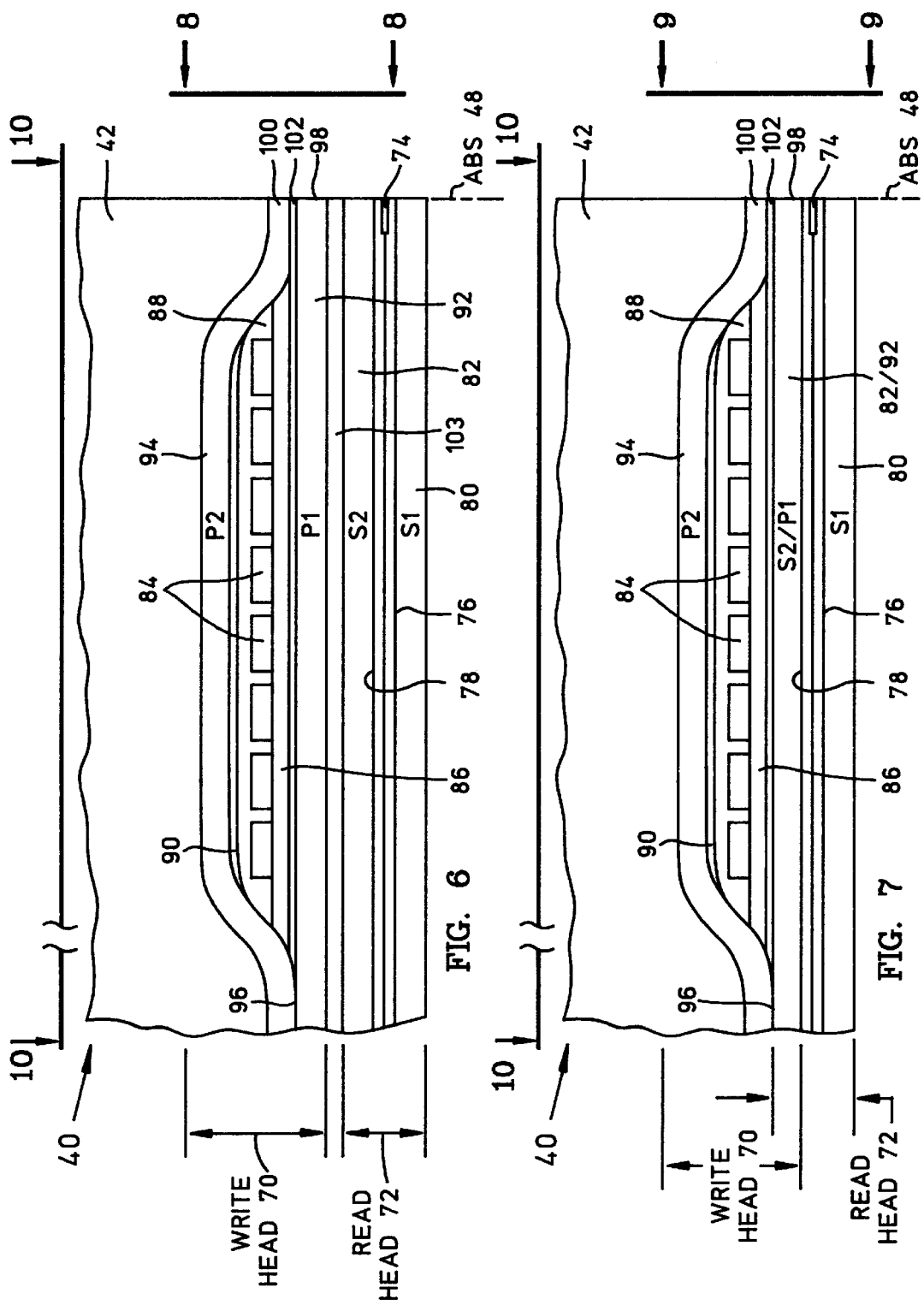

(ABS)

ANTIPARALLEL PINNED READ SENSOR WITH IMPROVED MAGNETRESISTANCE

BACKGROUND OF THE INVENTION

1. Field of the Invention

The present invention relates to an antiparallel (AP) pinned read sensor with an improved magnetoresistance and, more particularly, to an AP pinned structure which shunts less sense current $I_S$.

2. Description of the Related Art

An exemplary high performance read head employs a spin valve sensor for sensing magnetic signal fields from a moving magnetic medium, such as a rotating magnetic disk. The sensor includes a nonmagnetic electrically conductive first spacer layer sandwiched between a ferromagnetic pinned layer and a ferromagnetic free layer. An antiferromagnetic pinning layer interfaces the pinned layer for pinning the magnetic moment of the pinned layer 90° to an air bearing surface (ABS) which is an exposed surface of the sensor that faces the rotating disk. First and second leads are connected to the spin valve sensor for conducting a sense current therethrough. A magnetic moment of the free layer is free to rotate upwardly and downwardly with respect to the ABS from a quiescent or zero bias point position in response to positive and negative magnetic signal fields from the rotating magnetic disk. The quiescent position which is typically parallel to the ABS, is the position of the magnetic moment of the free layer when the sense current is conducted through the sensor without magnetic field signals from the rotating magnetic disk. The quiescent position of the magnetic moment of the free layer is preferably parallel to the ABS. If the quiescent position of the magnetic moment is not parallel to the ABS the positive and negative responses of the free layer will not be equal which results in read signal asymmetry which is discussed in more detail hereinbelow.

The thickness of the spacer layer is chosen so that shunting of the sense current and a magnetic coupling between the free and pinned layers are minimized. This thickness is typically less than the mean free path of electrons conducted through the sensor. With this arrangement, a portion of the conduction electrons is scattered by the interfaces of the spacer layer with the pinned and free layers. When the magnetic moments of the pinned and free layers are parallel with respect to one another scattering is minimal and when their magnetic moments are antiparallel scattering is maximized. An increase in scattering of conduction electrons increases the resistance of the spin valve sensor and a decrease in scattering of the conduction electrons decreases the resistance of the spin valve sensor. Changes in resistance of the spin valve sensor is a function of $\cos\theta$, where $\theta$ is the angle between the magnetic moments of the pinned and free layers. The sensitivity of the sensor is quantified as magnetoresistive coefficient $dr/R$ where $dr$ is the change in resistance of the spin valve sensor from minimum resistance (magnetic moments of free and pinned layers parallel) to maximum resistance (magnetic moments of the free and pinned layers antiparallel) and R is the resistance of the spin valve sensor at minimum magnetoresistance. A spin valve sensor is sometimes referred to as a giant magnetoresistive (GMR) sensor.

The transfer curve (magnetoresistive coefficient $dr/R$ or readback signal of the spin valve head versus applied signal from the magnetic disk) of a spin valve sensor is a substantially linear portion of the aforementioned function of $\cos\theta$. The greater this angle, the greater the resistance of the spin valve to the sense current and the greater the readback signal (voltage sensed by processing circuitry). With positive and negative magnetic fields from a rotating magnetic disk (assumed to be equal in magnitude), it is important that positive and negative changes of the resistance of the spin valve read head be equal in order that the positive and negative magnitudes of the readback signals are equal. When this occurs the bias point on the transfer curve is considered to be zero and is located midway between the maximum positive and negative readback signals. When the direction of the magnetic moment of the free layer is parallel to the ABS, and the direction of the magnetic moment of the pinned layer is perpendicular to the ABS in a quiescent state, the bias point is located at zero and the positive and negative readback signals will be equal when sensing positive and negative magnetic fields from the magnetic disk. The readback signals are then referred to in the art as having symmetry about the zero bias point. When the readback signals are not equal the readback signals are asymmetric.

The location of the bias point on the transfer curve is influenced by three major forces on the free layer, namely a ferromagnetic coupling field $H_F$ between the pinned layer and the free layer, a demag field $H_{demag}$ from the pinned layer, and sense current fields $H_I$ from all conductive layers of the spin valve except the free layer.

When the sense current $I_S$ is conducted through the spin valve sensor, the pinning layer (if conductive), the pinned layer and the first spacer layer, which are all on one side of the free layer, impose sense current fields on the free layer that rotate the magnetic moment of the free layer toward a first direction perpendicular to the ABS. The pinned layer demagnetization field $H_{demag}$ further rotates the magnetic moment of the free layer toward the first direction counteracted by a ferromagnetic coupling field $H_F$ of the pinned layer that rotates the magnetic moment of the free layer toward a second direction antiparallel to the first direction.

Since the conductive material on the pinned layer side of the free layer far outweighs the conductive material on the other side of the free layer the sense current fields from the pinned layer side are a major force on the free layer which is difficult to counterbalance with the other magnetic forces acting on the free layer. Further, the conduction of the sense current $I_S$ through metallic layers of the spin valve sensor, other than the spacer layer, in effect shunts a portion of the sense current which reduces the amplitude of the signal detected by the read head. If less current is shunted through the conductive layers, other than the spacer layer, this can result in more sense current $I_S$ being conducted through the spacer layer to increase signal detection, or alternatively the sense current $I_S$ can be reduced to lower the generation of heat. If the pinned layer is an antiparallel (AP) pinned layer structure instead of a single pinned layer the aforementioned problems are exacerbated.

The AP pinned spin valve sensor differs from the simple spin valve sensor in that the AP pinned spin valve sensor has an AP pinned structure that has first and second AP pinned layers instead of a single pinned layer. An AP coupling layer is sandwiched between the first and second AP pinned layers. The first AP pinned layer has its magnetic moment oriented in a first direction by exchange coupling to the antiferromagnetic pinning layer. The second AP pinned layer is immediately adjacent to the free layer and is antiparallel coupled to the first AP pinned layer because of the minimal thickness (in the order of 8 Å) of the AP coupling layer between the first and second AP pinned layers. Accordingly, the magnetic moment of the second AP pinned layer is oriented in a second direction that is antiparallel to the direction of the magnetic moment of the first AP pinned layer.

The AP pinned structure is preferred over the single pinned layer because the magnetic moments of the first and second AP pinned layers of the AP pinned structure subtractively combine to provide a net magnetic moment that is less than the magnetic moment of the single pinned layer. The direction of the net moment is determined by the thicker of the first and second AP pinned layers. A reduced net magnetic moment equates to a reduced demagnetization (demag) field $H_{demag}$ from the AP pinned structure. Since the exchange coupling between the pinned and pinning layers is inversely proportional to the net pinning moment a reduced net magnetic moment increases the exchange coupling between the first AP pinned layer and the pinning layer. The AP pinned spin valve sensor is described in commonly assigned U.S. Pat. No. 5,465,185 to Heim and Parkin.

Since an AP pinned structure has more conductive metallic material on the pinned side of the free layer than a single pinned layer the sense current field on the free layer is increased from the pinned layer side of the free layer and more of the sense current is shunted instead of being conducted through the spacer layer. Accordingly, there is a strong felt need to provide an AP pinned structure as well as a single pinned layer that shunts less sense current for improving the biasing of the free layer and increasing signals detected by the read head.

SUMMARY OF THE INVENTION

A typical material employed for the simple pinned layer and the AP pinned layers of an AP pinned structure is cobalt (Co) or cobalt iron (CoFe). I have reduced sense current shunting through the single pinned layer or the AP pinned structure by providing the single pinned layer and one or both of the AP pinned layers of the AP pinned structure with a material that has a higher resistance than cobalt (Co) or cobalt iron (CoFe) while still maintaining desirable ferromagnetic properties. This has been accomplished by providing the single pinned layer or the pinned layer structure with a cobalt niobium (CoNb) based material that is amorphous. Cobalt niobium (CoNb), which is amorphous, has a resistance which is substantially five times the resistance of cobalt (Co), which is crystalline. It is important that sufficient niobium (Nb) be added to the cobalt (Co) to bring the alloy to an amorphous state. This percentage should be at least 5% and may be as high as 20%. It is desirable to keep the content of the niobium (Nb) as small as possible since niobium (Nb) reduces the magnetization ($M_S$) of the pinned structure. In a preferred pinned structure a cobalt iron (CoFe) layer may be located between the cobalt niobium (CoNb) pinned layer and the spacer layer for promoting the magnetoresistive effect. However, if the pinned layer is cobalt iron niobium (CoFeNb) then the improved magnetoresistive effect may be obtained without the intervening cobalt iron (CoFe) layer. In the AP pinned structure only the first AP pinned layer may be provided with a cobalt niobium (CoNb) film and the second AP pinned layer maybe a cobalt iron (CoFe) layer. Alternatively, the cobalt niobium (CoNb) film may be employed in both of the AP pinned layers and in a preferred embodiment, may be sandwiched between cobalt iron (CoFe) films for improving texture of the films and increasing the magnetoresistive effect.

An object of the present invention is to provide a simple pinned layer or an AP pinned layer structure which shunts less sense current $I_S$.

Another object is to provide a material for a pinned structure which, not only reduces sense current shunting because of a greater resistance to the sense current, but also has a composition which promotes magnetoresistance by interfacing the spacer layer.

A further object is to provide an AP pinned structure which employs a high magnetization low current shunting film in one or both of the AP pinned layers of the structure or is combined with cobalt (Co) or cobalt iron (CoFe) in one or both of the AP pinned layers for further increasing a magnetoresistance of the spin valve sensor.

Other objects and attendant advantages of the invention will be appreciated upon reading the following description taken together with the accompanying drawings.

BRIEF DESCRIPTION OF THE DRAWINGS

FIG. 6 is a partial view of the slider and a piggyback magnetic head as seen in plane 6—6 of FIG. 2;

FIG. 7 is a partial view of the slider and a merged magnetic head as seen in plane 7—7 of FIG. 2;

DESCRIPTION OF THE PREFERRED EMBODIMENTS

Magnetic Disk Drive

Figure 1:
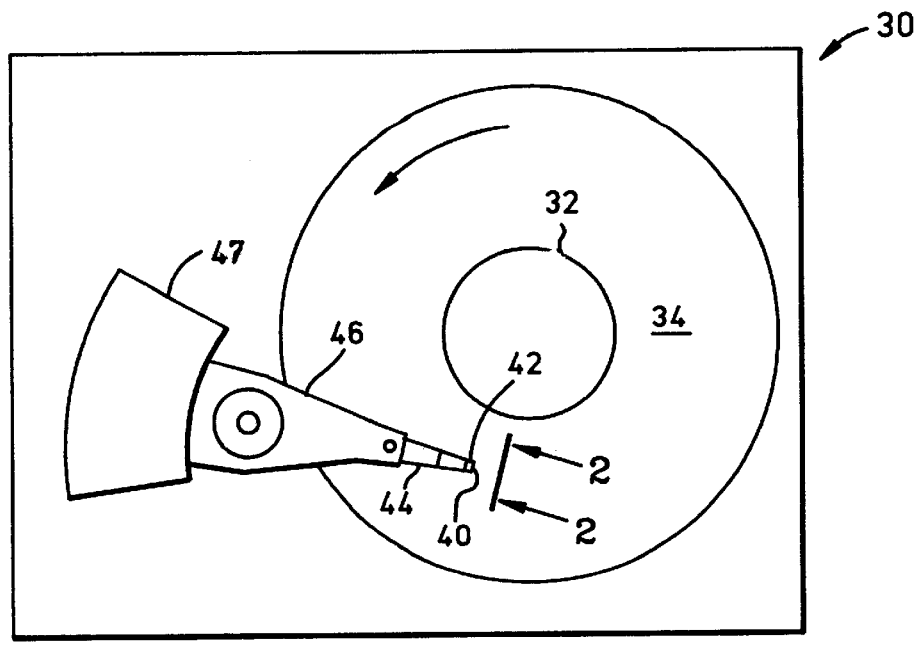
FIG. 1 is a plan view of an exemplary magnetic disk drive.
Figure 2:
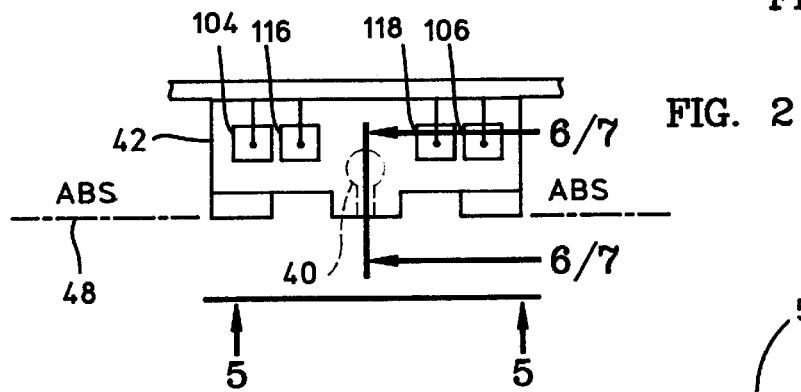
FIG. 2 is an end view of a slider with a magnetic head of the disk drive as seen in plane 2—2.
Figure 3:
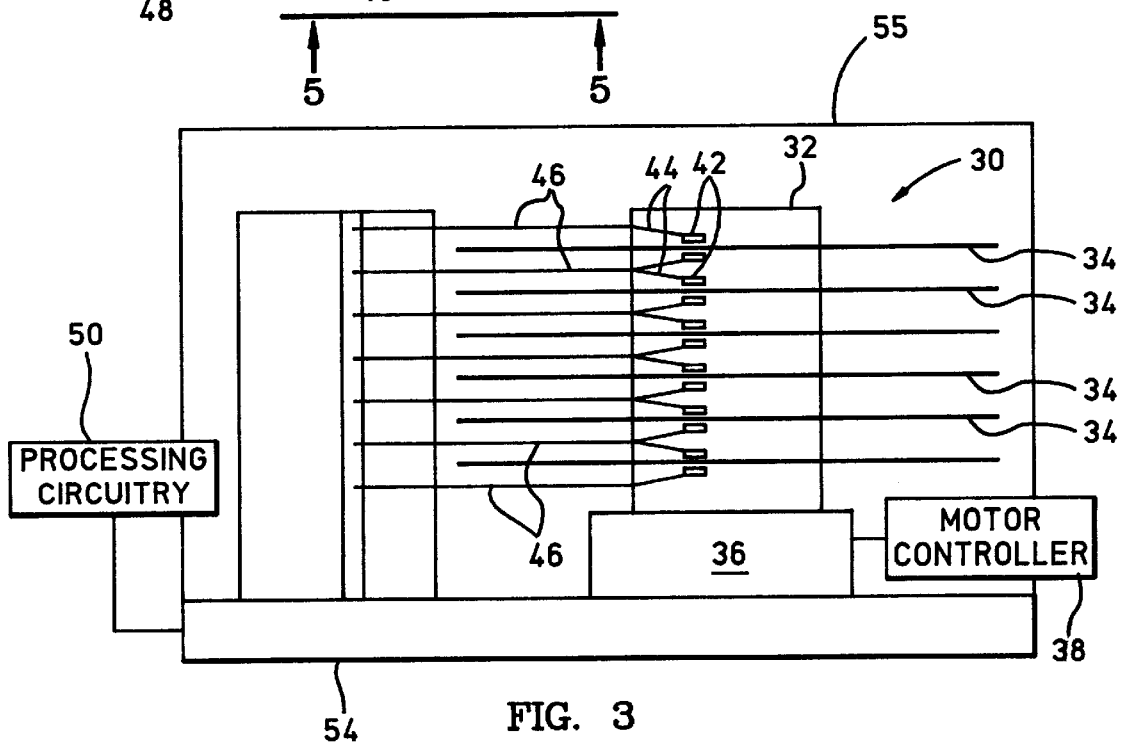
FIG. 3 is an elevation view of the magnetic disk drive wherein multiple disks and magnetic heads are employed.
Figure 4:
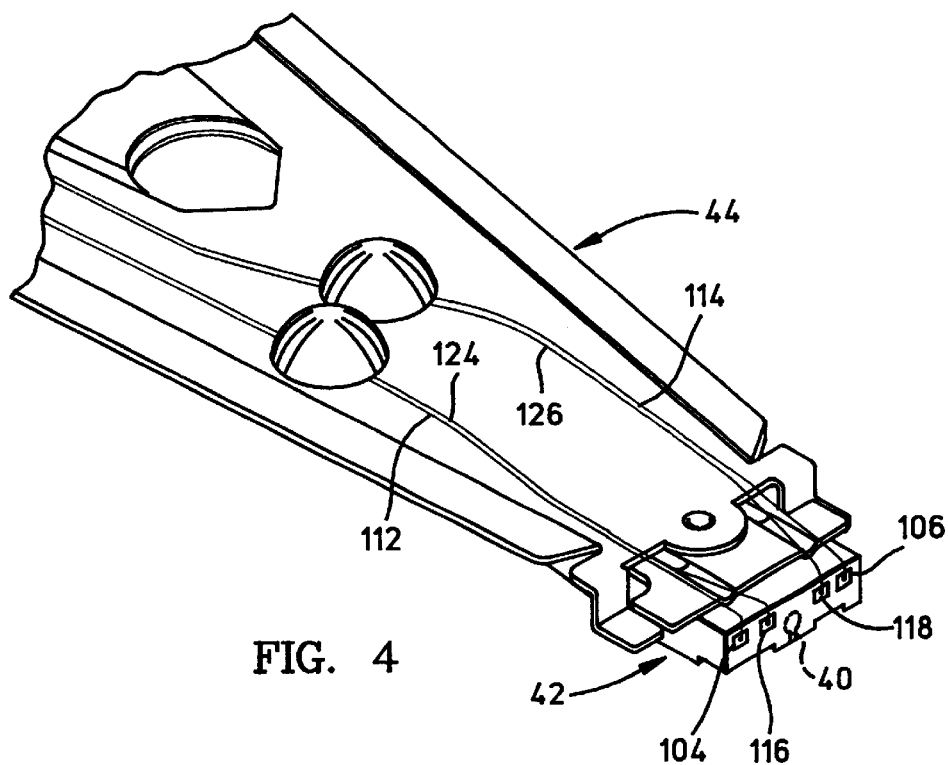
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a spindle motor 36 that is controlled by a motor controller 38. A slider 42 supports a combined read and write magnetic head 40 which is mounted on a suspension 44 that is moved by actuator arm 46. The actuator arm 46 is rotatably positioned by an actuator 47. A plurality of disks, sliders and suspensions may be employed in a large capacity direct access storage device (DASD) as shown in FIG. 3. The actuator arm 47 moves the actuator arm 46 and the suspension 44 to position the slider 42 so that the magnetic head 40 is in a transducing relationship with a surface of the magnetic disk 34. When the disk 34 is rotated by the spindle motor 36 the slider is supported on a thin (typically, 0.05 $\mu$m) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides spindle motor drive signals for rotating the magnetic disk 34, and provides control signals to the actuator 47 for moving the slider to various tracks on the disk. In FIG. 4 the slider 42 is shown mounted to a suspension 44. The components described hereinabove may be mounted on a frame 54 of a housing, as shown in FIG. 3.

Figure 5:
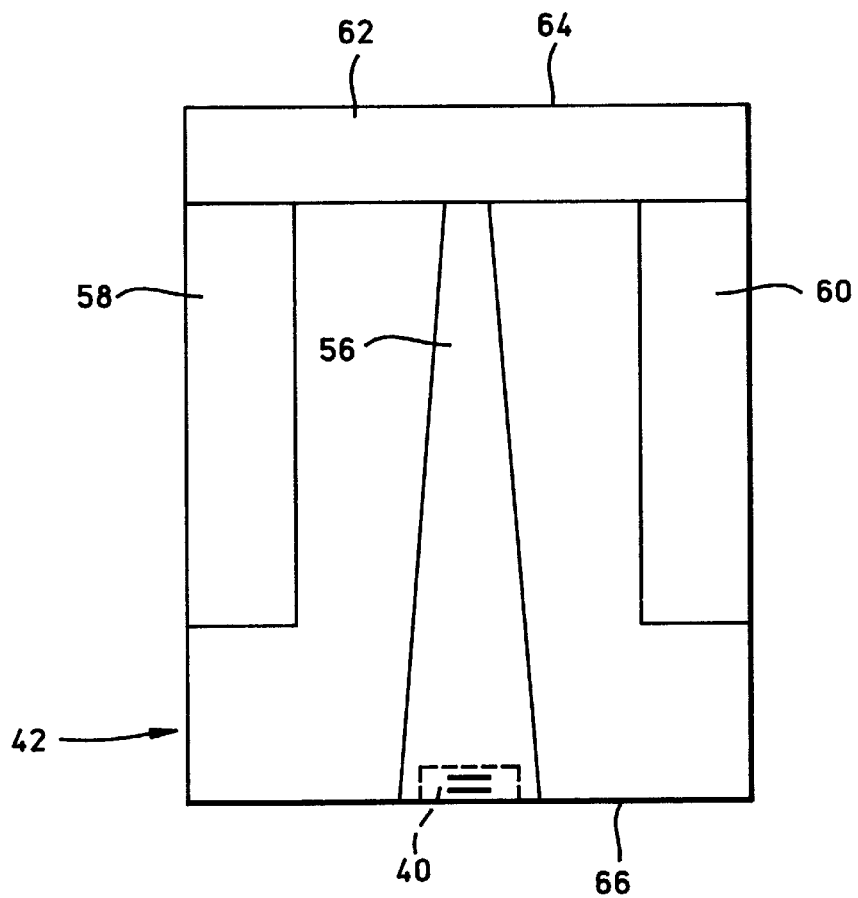
FIG. 5 is an ABS view of the magnetic head taken along plane 5—5 of FIG. 2.
Figure 10:
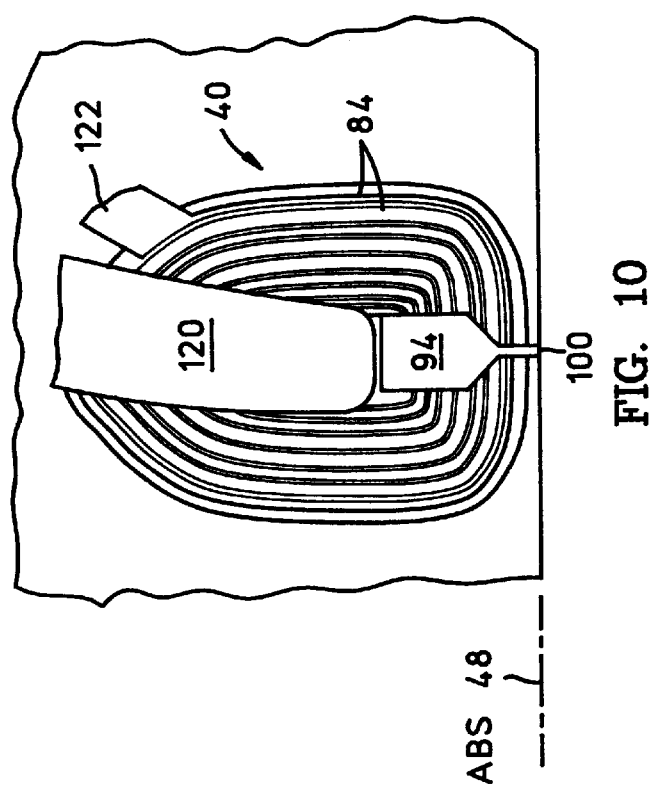
FIG. 10 is a view taken along plane 10—10 of FIGS. 6 or 7 with all material above the coil layer and leads removed.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 8:
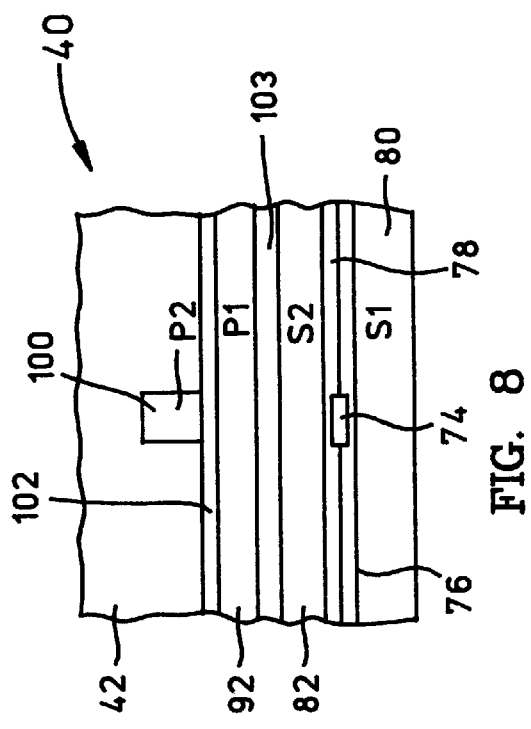
FIG. 8 is a partial ABS view of the slider taken along plane 8—8 of FIG. 6 to show the read and write elements of the piggyback magnetic head.

FIG. 6 is a side cross-sectional elevation view of a piggyback magnetic head 40, which includes a write head portion 70 and a read head portion 72, the read head portion employing a spin valve sensor 74 of the present invention. FIG. 8 is an ABS view of FIG. 6. The spin valve sensor 74 is sandwiched between nonmagnetic electrically insulative first and second read gap layers 76 and 78, and the read gap layers are sandwiched between ferromagnetic first and second shield layers 80 and 82. In response to external magnetic fields, the resistance of the spin valve sensor 74 changes. A sense current $I_S$ conducted through the sensor causes these resistance changes to be manifested as potential changes. These potential changes are then processed as readback signals by the processing circuitry 50 shown in FIG. 3.

The write head portion 70 of the magnetic head 40 includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. An insulation layer 103 is located between the second shield layer 82 and the first pole piece layer 92. Since the second shield layer 82 and the first pole piece layer 92 are separate layers this head is known as a piggyback head. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 8) to leads 124 and 126 on the suspension.

Figure 9:
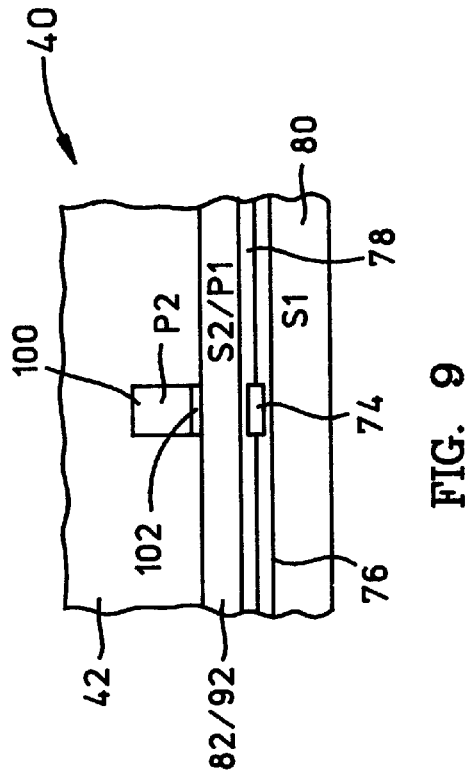
FIG. 9 is a partial ABS view of the slider taken along plane 9—9 of FIG. 7 to show the read and write elements of the merged magnetic head.

FIGS. 7 and 9 are the same as FIGS. 6 and 8 except the second shield layer 82 and the first pole piece layer 92 are a common layer. This type of head is known as a merged magnetic head. The insulation layer 103 of the piggyback head in FIGS. 6 and 8 is omitted.

Figure 11:
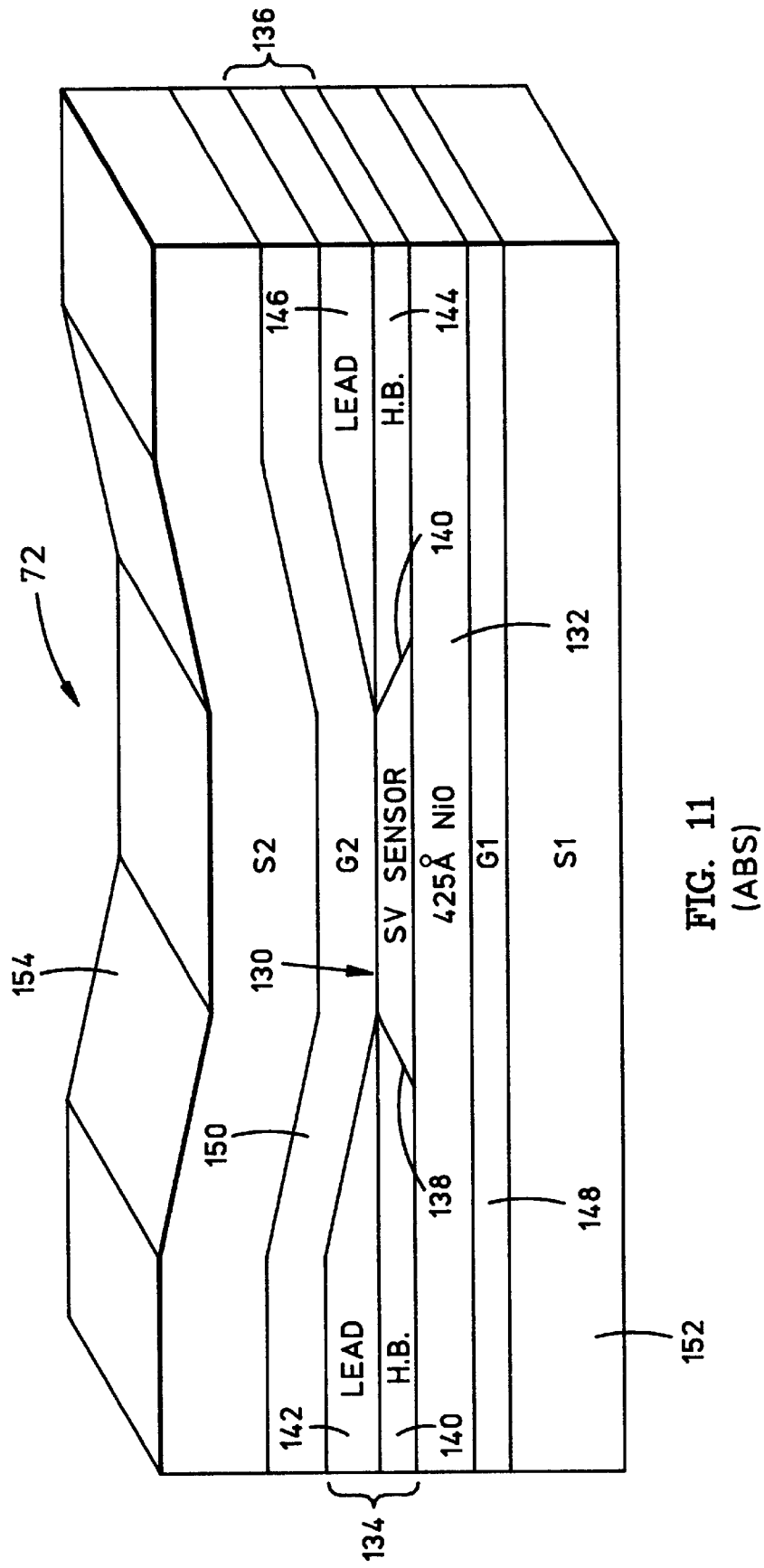
FIG. 11 is an isometric ABS illustration of a read head which employs a spin valve (SV) sensor.

FIG. 11 is an isometric ABS illustration of the read head 72 shown in FIGS. 6 or 8. The read head 72 includes the present spin valve sensor 130 which is located on an antiferromagnetic (AFM) pinning layer 132. A ferromagnetic pinned layer in the spin valve sensor 130, which is to be described hereinafter, has a magnetic moment that is pinned by the magnetic spins of the pinning layer 132. The AFM pinning layer may be 425 Å of nickel oxide (NiO). First and second hard bias and lead layers 134 and 136 are connected to first and second side edges 138 and 140 of the spin valve sensor. This connection is known in the art as a contiguous junction. The first hard bias and lead layers 134 include a first hard bias layer 140 and a first lead layer 142 and the second hard bias and lead layers 136 include a second hard bias layer 144 and a second lead layer 146. The hard bias layers 140 and 144 cause magnetic fields to extend longitudinally through the spin valve sensor 130 for stabilizing the magnetic domains therein. The AFM pinning layer 132, the spin valve sensor 130 and the first and second hard bias and lead layers 134 and 136 are located between nonmagnetic electrically insulative first and second read gap layers 148 and 150. The first and second read gap layers 148 and 150 are, in turn, located between ferromagnetic first and second shield layers 152 and 154.

EXAMPLE 1

Figure 12:
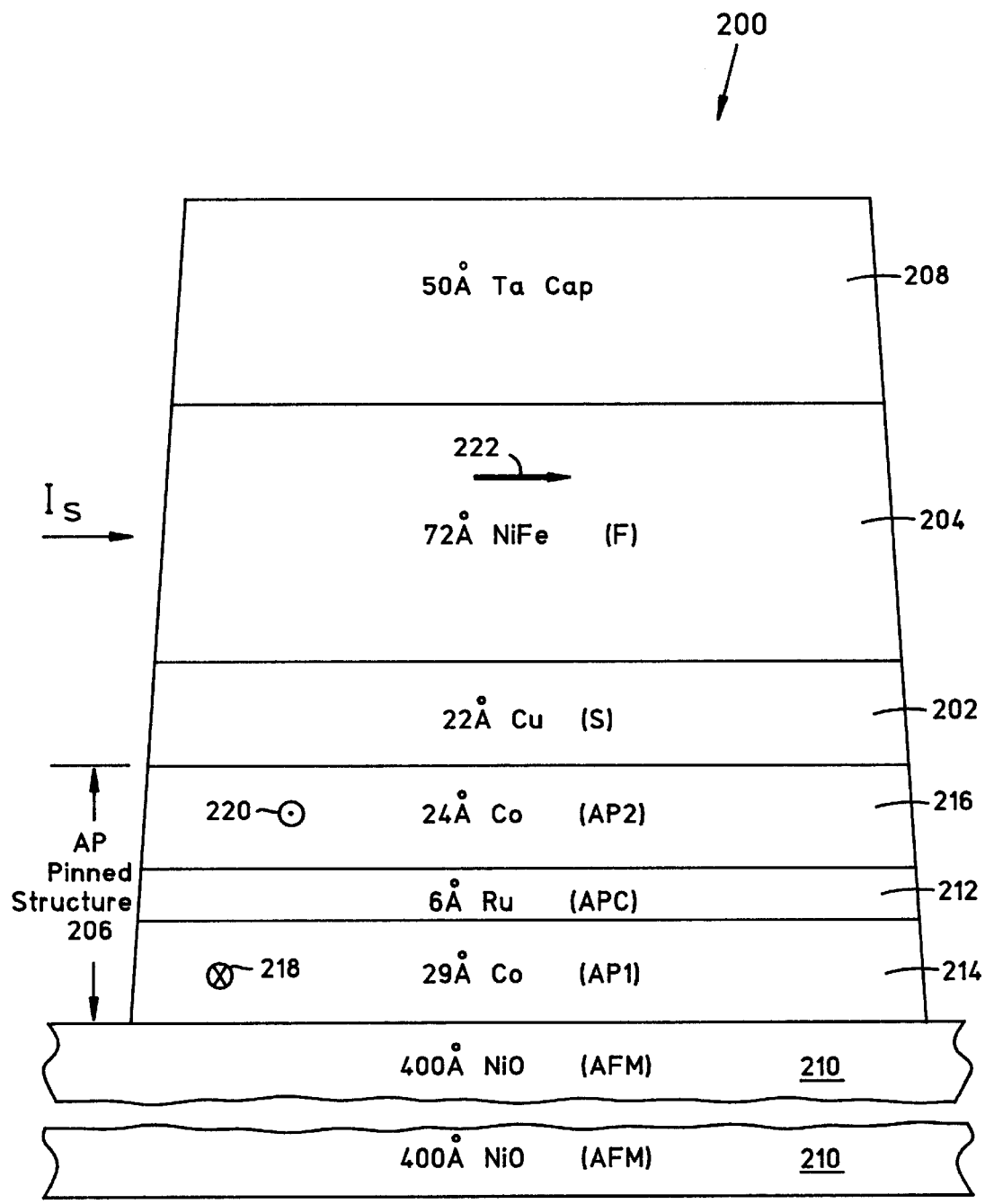
FIG. 12 is an ABS illustration of a prior art spin valve sensor.

FIG. 12 shows an ABS illustration of a prior art AP pinned spin valve sensor 200 which includes a spacer layer (S) 202 which is located between a free layer (F) 204 and an antiparallel (AP) pinned structure 206. A cap layer 208 may be located on the free layer 204 for protecting it from subsequent processing steps. The AP pinned structure 206 includes an AP coupling layer (APC) 212 which is located between first and second antiparallel layers (AP1) and (AP2) 214 and 216. The pinning layer 210 may pin a magnetic moment 218 of the first AP pinned layer 214 perpendicular to and away from the ABS and by an antiparallel coupling between the first and second AP pinned layers 214 and 216 a magnetic moment 220 of the second AP pinned layer 216 is pinned antiparallel to the magnetic moment 218 in a direction perpendicular to and toward the ABS. A magnetic moment 222 of the free layer 204 may be directed parallel to the ABS either right to left or left to right as shown in FIG. 12. It is the relative rotations between the magnetic moments 220 and 222 that determine the resistance of the spin valve sensor. When a signal field rotates the magnetic moment 222 of the free layer upwardly away from the ABS the resistance increases and when a signal field rotates the magnetic moment 222 downwardly toward the ABS the resistance decreases.

A typical material for the first and second AP pinned layers 214 and 216 is cobalt (Co). Cobalt iron (CoFe) is an optional material. Unfortunately, the cobalt (Co) first and second AP pinned layers 214 and 216 shunt a portion of the sense current $I_S$ which decreases the signal detected by the spin valve sensor and also imposes high sense current fields on the free layer 204 which adversely affect its biasing. The sheet resistance of each of the layers shown in FIG. 12 and the percentage of sense current $I_S$ conducted through the layers is shown in the following Chart A.

Chart A

| Layer | Thickness (Å) | Material | Shunt Resistance ($\mu \Omega$ cm) | % $I_S$ Conducted |
|---|---|---|---|---|
| Cap | 50 | Ta | 200 | 2.0 |
| (F) | 72 | NiFe | 25 | 24.0 |
| (S) | 22 | Cu | 2.7 | 47.0 |
| (AP2) | 24 | Co | 11.6 | 12.0 |
| (APC) | 6 | Ru | 20.0 | 1.25 |
| (AP1) | 29 | Co | 11.6 | 15.0 |
| (AFM) | 400 | NiO | 0 | 0 |

It can be seen from Chart A that the AP pinned structure comprising the first and second AP pinned layers (AP1) and (AP2) 214 and 216 and the antiparallel coupling layer (APC) 212 accounts for 28.25% of the sense current $I_S$ conducted through the sensor. Accordingly, there is a strong-felt need for reducing the percentage of sense current $I_S$ conducted through the AP pinned structure which is discussed in the next example.

The thicknesses and materials of the remaining layers are 400 Å of nickel iron (NiO) for the pinning layer 210, 29 Å of cobalt (Co) for the first AP pinned layer 214, 6 Å of ruthenium (Ru) for the antiparallel coupling layer 212, 24 Å of cobalt (Co) for the second AP pinned layer 216, 22 Å of copper (Cu) for the spacer layer 202, 72 Å of nickel iron (NiFe) for the free layer 204 and 50 Å of tantalum (Ta) for the cap layer 208.

EXAMPLE 2

Figure 13:
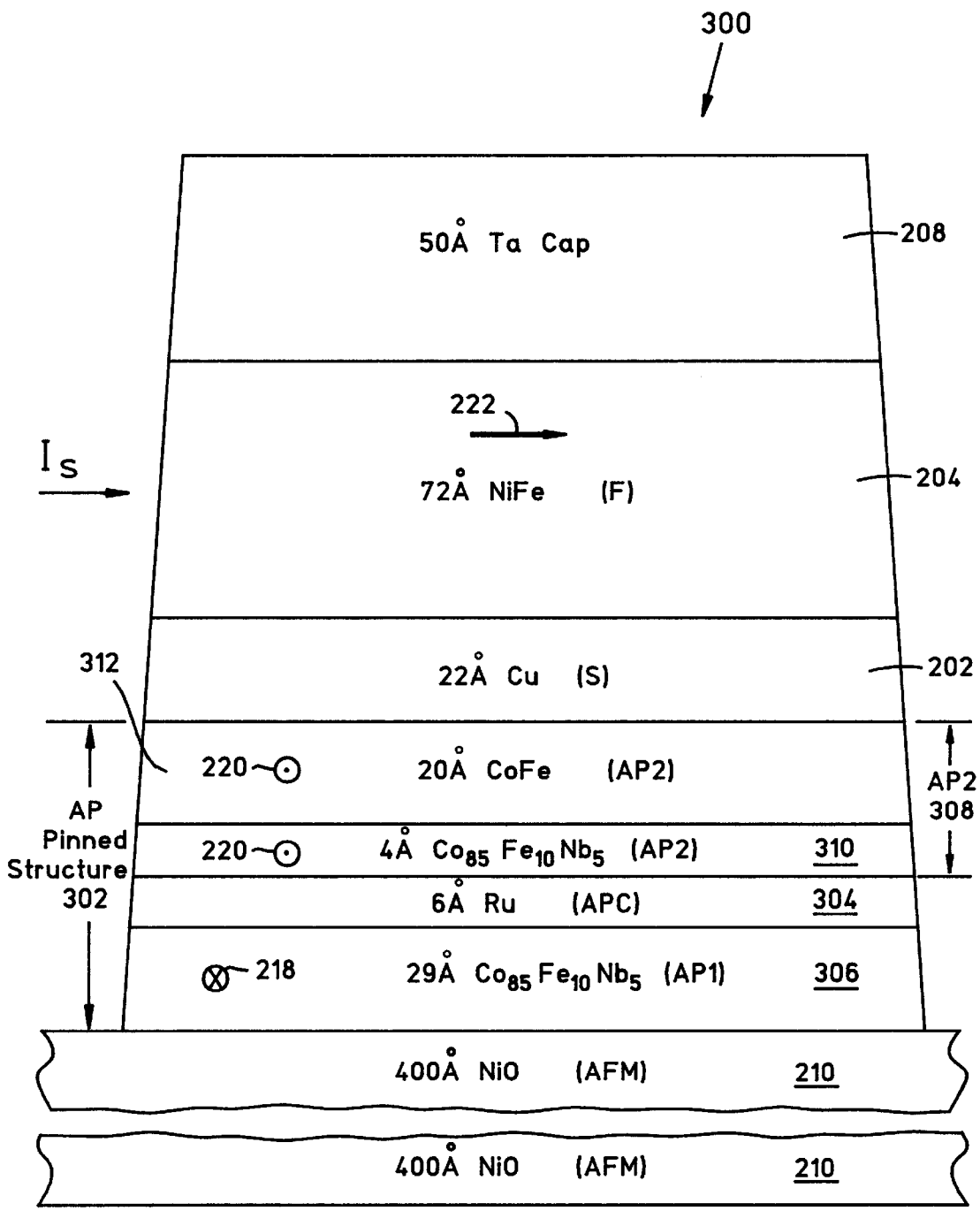
FIG. 13 is an ABS illustration of a spin valve sensor which is a first embodiment of the present invention.

The spin valve sensor 300, shown in FIG. 13, is a first embodiment of the present invention and is contrasted with the prior art spin valve sensor shown in FIG. 12. The spin valve sensor 300 is the same as the spin valve sensor 200 except for the AP pinned structure 302. The AP pinned structure 302 includes an antiparallel coupling (APC) layer 304 which is located between a first AP coupling layer (AP1) 306 and a second AP coupling layer (AP2) 308. The second AP pinned layer 308 includes first and second films 310 and 312. The AP coupling layer 304 is composed of 6 Å of ruthenium (Ru). The first AP coupling layer 306 is composed of 29 Å of cobalt iron niobium ($Co_{85}Fe_{10}Nb_5$). The first film 310 of the second AP pinned layer is composed of 4 Å of cobalt iron niobium ($Co_{85}Fe_{10}Nb_5$) and the second film 312 of the second AP pinned layer is composed of 20 Å of cobalt iron (CoFe). The results of the sheet resistances of these layers and the percentages of sense current $I_S$ conducted through the layers is shown in Chart B.

Chart B

| Layer | Thickness (Å) | Material | Shunt Resistance ($\mu \Omega$ cm) | % $I_S$ Conducted |
|---|---|---|---|---|
| Cap | 50 | Ta | 200 | 2 |
| (F) | 72 | NiFe | 25 | 27 |
| (S) | 22 | Cu | 2.7 | 53 |
| (AP2) | 20 | CoFe | ? | 11.2 |
| (AP2) | 4 | CoFeNb | 80 | 0.7 |
| (APC) | 6 | Ru | 20 | 1.4 |
| (AP1) | 29 | CoFeNb | 80 | 4.4 |
| (AFM) | 400 | AFM NiO | 0 | 0 |

The total of the percentage of the sense current $I_S$ conducted through the AP pinned structure 302 in FIG. 13 is 17.7% as compared to 28.25% for the AP pinned structure 206 in FIG. 200. Accordingly, there is a significant drop in the percentage of the sense current conducted through the AP pinned structure 300 as compared to the percentage of sense current $I_S$ conducted through the AP pinned structure of the spin valve sensor 200. This means that the detected signal will be significantly increased and there will be significantly less sense current field biasing the free layer 204.

It is important that one or both of the antiparallel pinned layers include a cobalt niobium (CoNb) based film that is amorphous. Cobalt (Co) or cobalt iron (CoFe) are crystalline and have high conductivity. By adding at least 5% niobium (Nb) the cobalt (Co) or cobalt iron (CoFe) is made amorphous which has a much higher resistance than either cobalt (Co) or cobalt iron (CoFe). As an example, the crystalline cobalt (Co) has a sheet resistance of 20 $\mu \Omega$cm and amorphous cobalt niobium (CoNb) has a sheet resistance of about 100 $\mu \Omega$cm. Accordingly, the sheet resistance of amorphous cobalt niobium (CoNb) is five times the resistance of crystalline cobalt (Co). By adding niobium (Nb) the magnetization ($M_S$) of the pinned layer becomes less which requires that the content of the niobium (Nb) be kept at a minimum. A maximum percentage of the niobium (Nb) is substantially 20% and a preferred percentage is 5%.

OTHER EMBODIMENTS OF THE INVENTION

Figure 14:
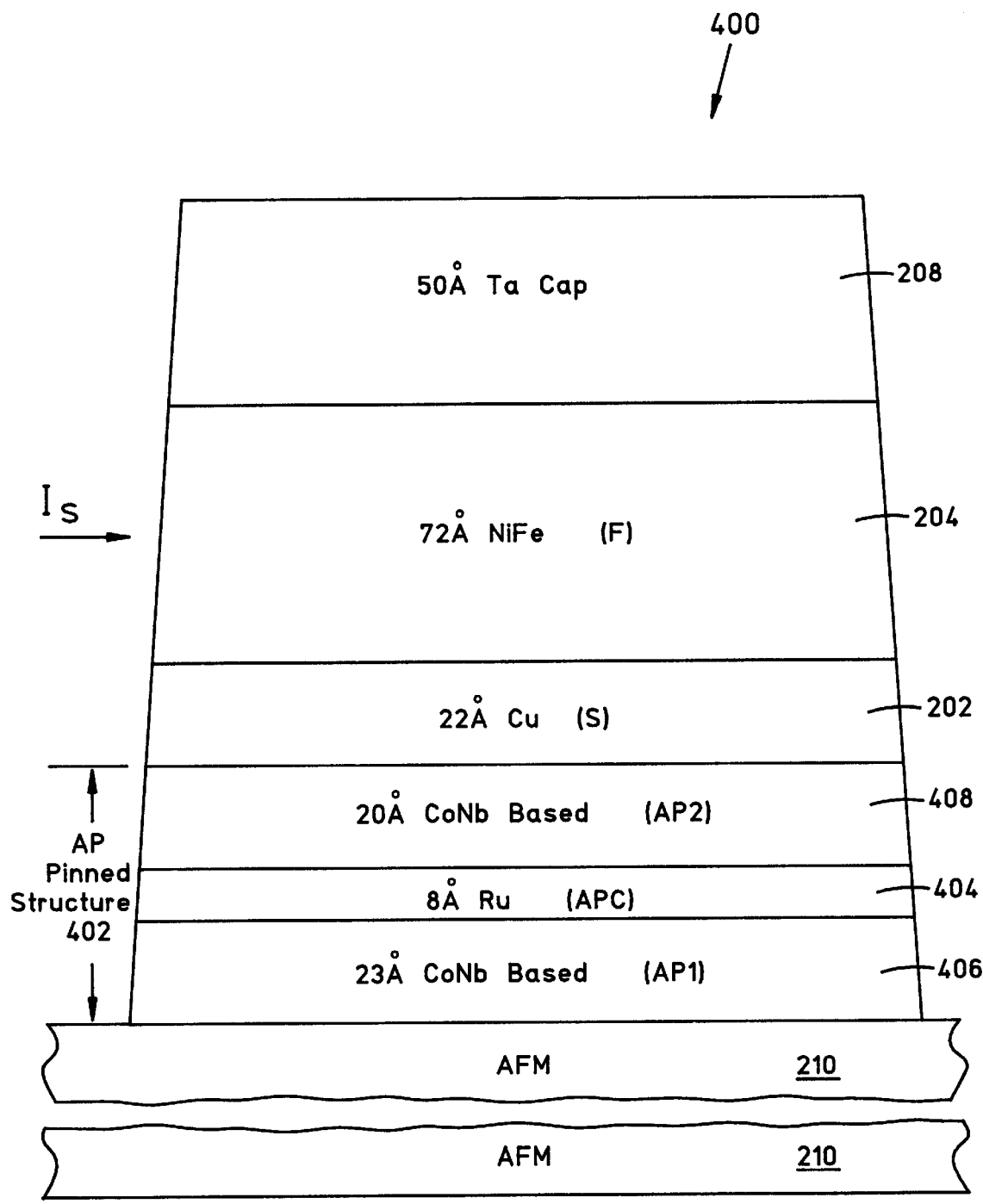
FIG. 14 is an ABS illustration of a spin valve sensor which is a second embodiment of the present invention.

A second embodiment of the present invention is shown by the spin valve sensor 400 in FIG. 14. This sensor is the same as the sensor 300 in FIG. 13 except for the AP pinned structure 402. The AP pinned structure 402 includes an antiparallel coupling layer (APC) 404 which is located between first and second AP pinned layers (AP1) and (AP2) 406 and 408. The first AP pinned layer 406 is 23 Å of a cobalt niobium (CoNb) based material and the second AP pinned layer 408 is 20 Å of a cobalt niobium (CoNb) based material. Accordingly, in this embodiment the first and second AP pinned layers 406 and 408 may be cobalt niobium (CoNb) or a cobalt niobium (CoNb) alloy including other metals such as iron (Fe) and/or hafnium (Hf).

Figure 15:
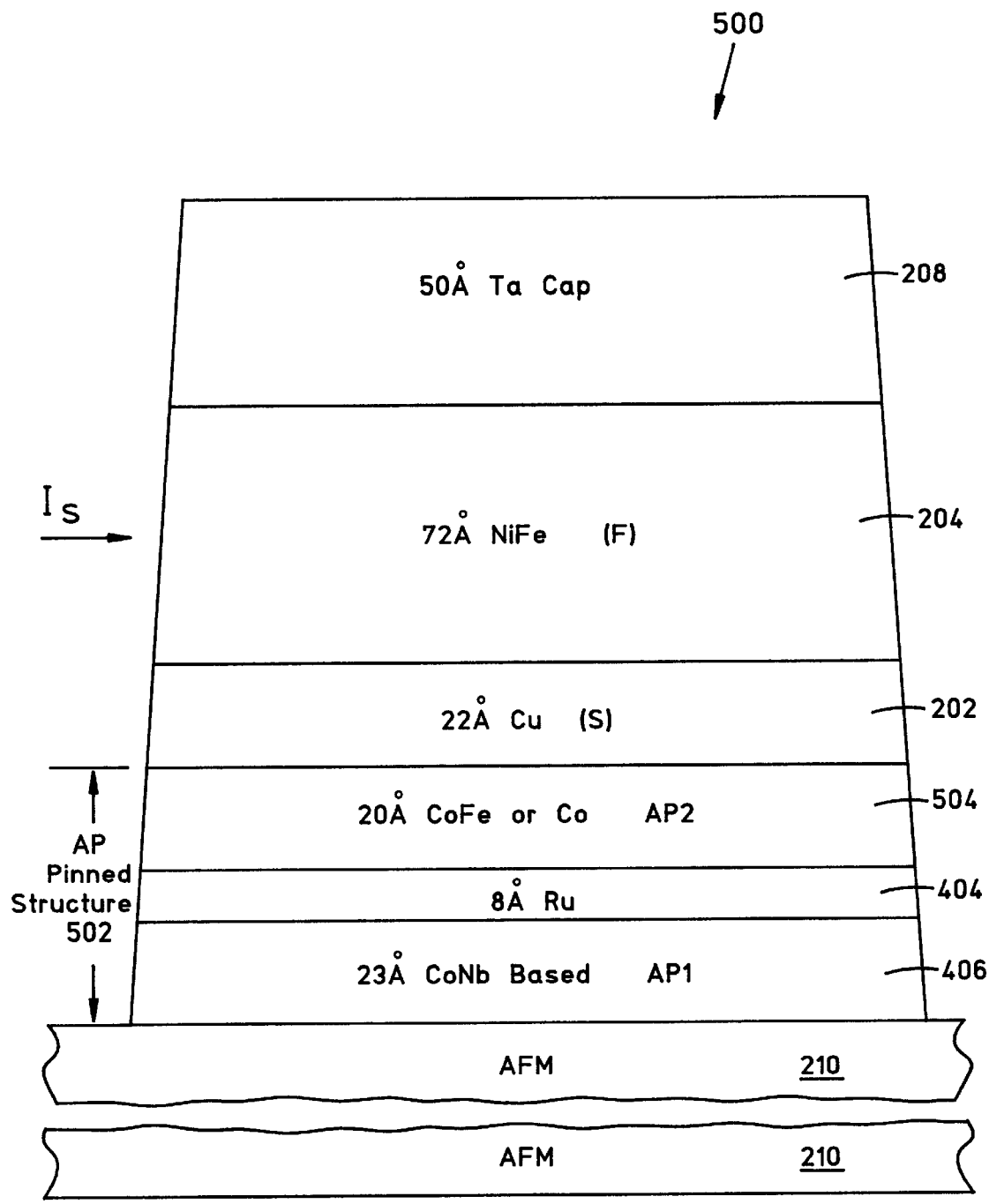
FIG. 15 is an ABS illustration of a spin valve sensor which is a third embodiment of the present invention.

A third embodiment of the present spin valve sensor 500 is shown in FIG. 15. The spin valve sensor 500 in FIG. 15 is the same as the same as the spin valve sensor 400 in FIG. 14 except for the AP pinned structure 502. The AP pinned structure 502 in FIG. 15 is the same as the AP pinned structure 402 in FIG. 14 except the second AP pinned layer 504 is 20 Å of cobalt iron (CoFe) or cobalt (Co). This embodiment has an advantage in that cobalt iron (CoFe) or cobalt (Co) next to a copper (Cu) spacer layer 202 enhances the magnetoresistance of the spin valve sensor.

Figure 16:
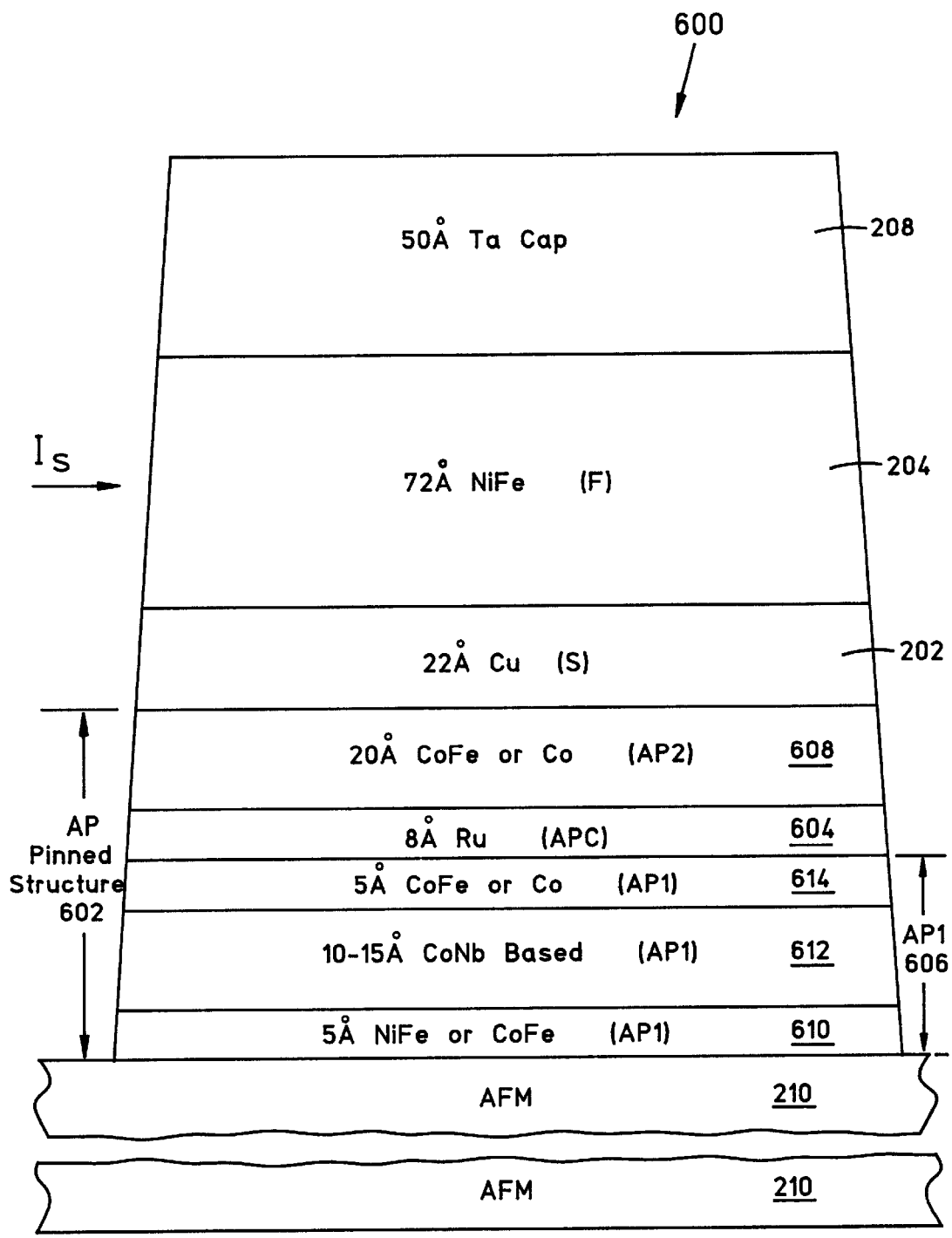
FIG. 16 is an ABS illustration of a spin valve sensor which is a fourth embodiment of the present invention.

A fourth embodiment of the present spin valve sensor 600 is shown in FIG. 16 which is the same as the embodiment shown in FIG. 15 except for the AP pinned structure 602. The AP pinned structure 602 includes an antiparallel coupling layer (APC) 604 which is located between a first AP pinned layer 606 and a second AP pinned layer 608. The first AP pinned layer 606 includes a first film which is 5 Å of nickel iron (NiFe) or cobalt iron (CoFe), a second film 612 which is 10 Å–15 Å of a cobalt niobium (CoNb) based material and a third film 614 which is 5 Å of cobalt iron (CoFe) or cobalt (Co). The antiparallel coupling layer 604 is 8 Å of ruthenium (Ru). The second AP pinned layer 608 is 20 Å of cobalt iron (CoFe) or cobalt (Co). This embodiment has the advantage in that cobalt iron (CoFe) or cobalt (Co) is adjacent the spacer layer 202 and cobalt iron (CoFe) or cobalt (Co) interfaces both sides of the antiparallel coupling layer 604. This relationship further enhances the magnetoresistance of the spin valve sensor. Further, the first film 610 of nickel iron (NiFe) or cobalt iron (CoFe) enhances the textures of subsequent layers deposited thereon which still further increases the magnetoresistance of the spin valve sensor.

Figure 17:
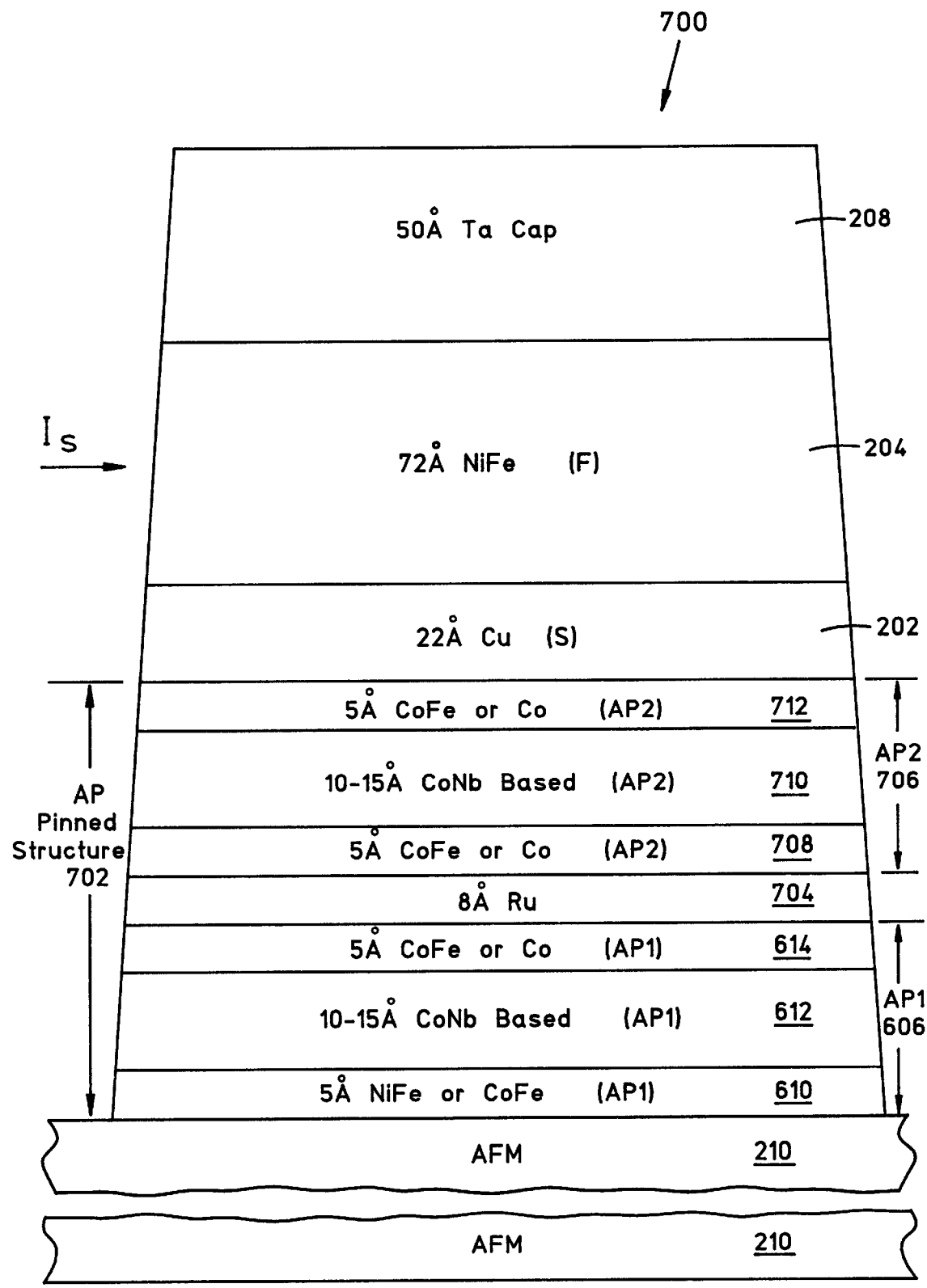
FIG. 17 is an ABS illustration of a spin valve sensor which is a fifth embodiment of the present invention.

FIG. 17 illustrates a fifth embodiment of the present spin valve sensor 700 which is the same as the spin valve sensor 600 in FIG. 16 except for the AP pinned structure 702. The AP pinned structure 702 includes an AP coupling layer (APC) 704 which is located between the first AP pinned layer 606 and a second AP pinned layer 706. The first AP pinned layer 606 is the same as the first AP pinned layer 606 in FIG. 16. The second AP pinned layer 706 includes a first film 708 which is composed of 5 Å of cobalt iron (CoFe) or cobalt (Co), a second film 710 which is composed of 10 Å–15 Å of a cobalt niobium (CoNb) based material and a third film 712 which is composed of 5 Å of cobalt iron (CoFe) or cobalt (Co). This embodiment has the same advantages as the embodiment 600 in FIG. 16 but, in addition, the second AP pinned layer will have increased resistance so that the percentage of sense current shunted therethrough will be less.

Figure 18:
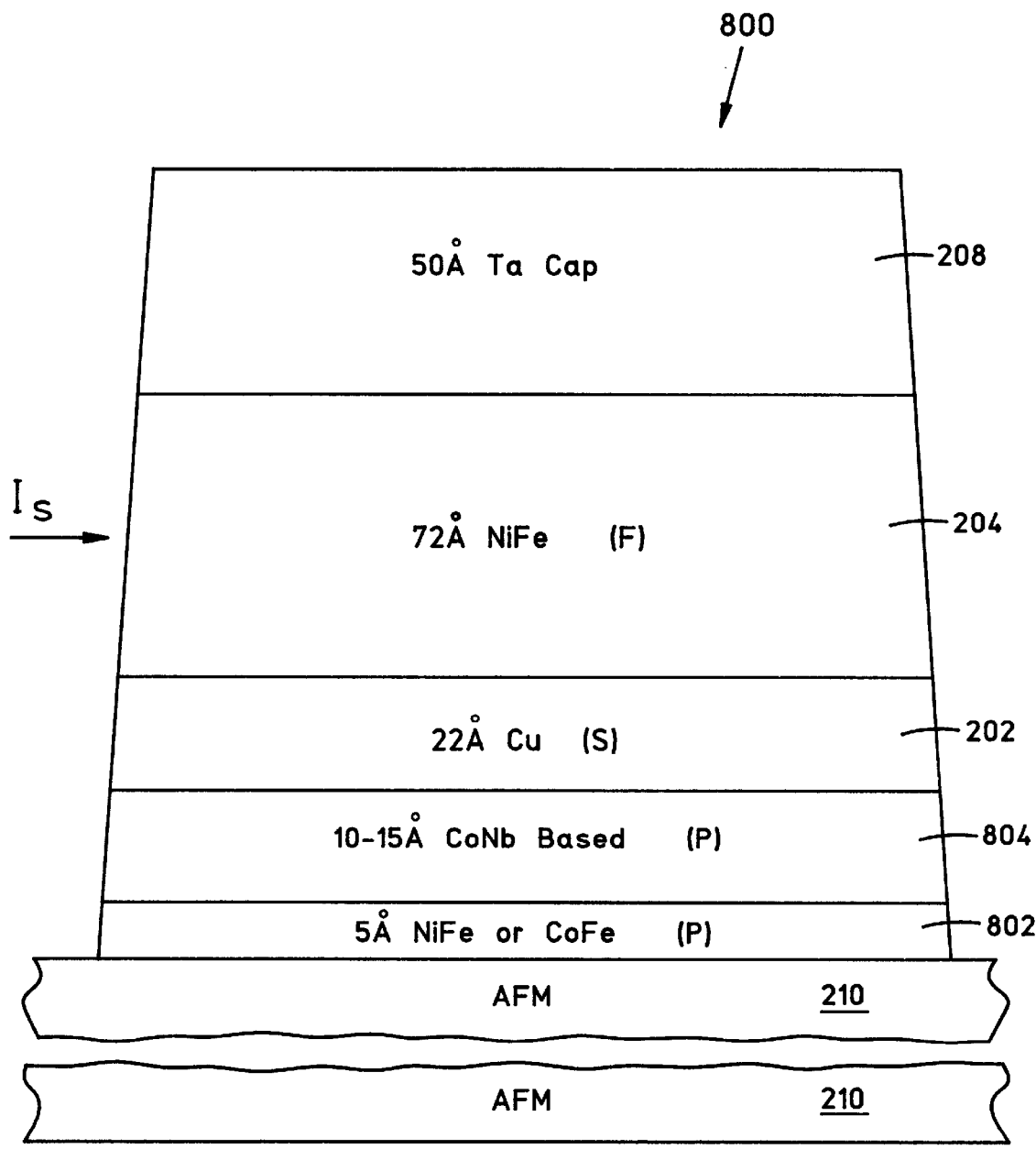
FIG. 18 is an ABS illustration of a simple pinned spin valve sensor which is a sixth embodiment of the present invention.

A sixth embodiment of the present invention is shown by the spin valve sensor 800 in FIG. 18. This embodiment is the same as the previous embodiments except it is a simple pinned sensor in contrast to an antiparallel pinned sensor. The simple pinned layer (P) includes a first film 802 composed of 5 Å of nickel iron (NiFe) or cobalt iron (CoFe) and a second film 804 composed of 10 Å–15 Å of cobalt niobium (CoNb) based material as discussed hereinabove. The film 804 significantly decreases the resistance of the simple pinned layer which demonstrates that the invention can be employed for either a simple spin valve or an AP pinned spin valve sensor.

Figure 19:
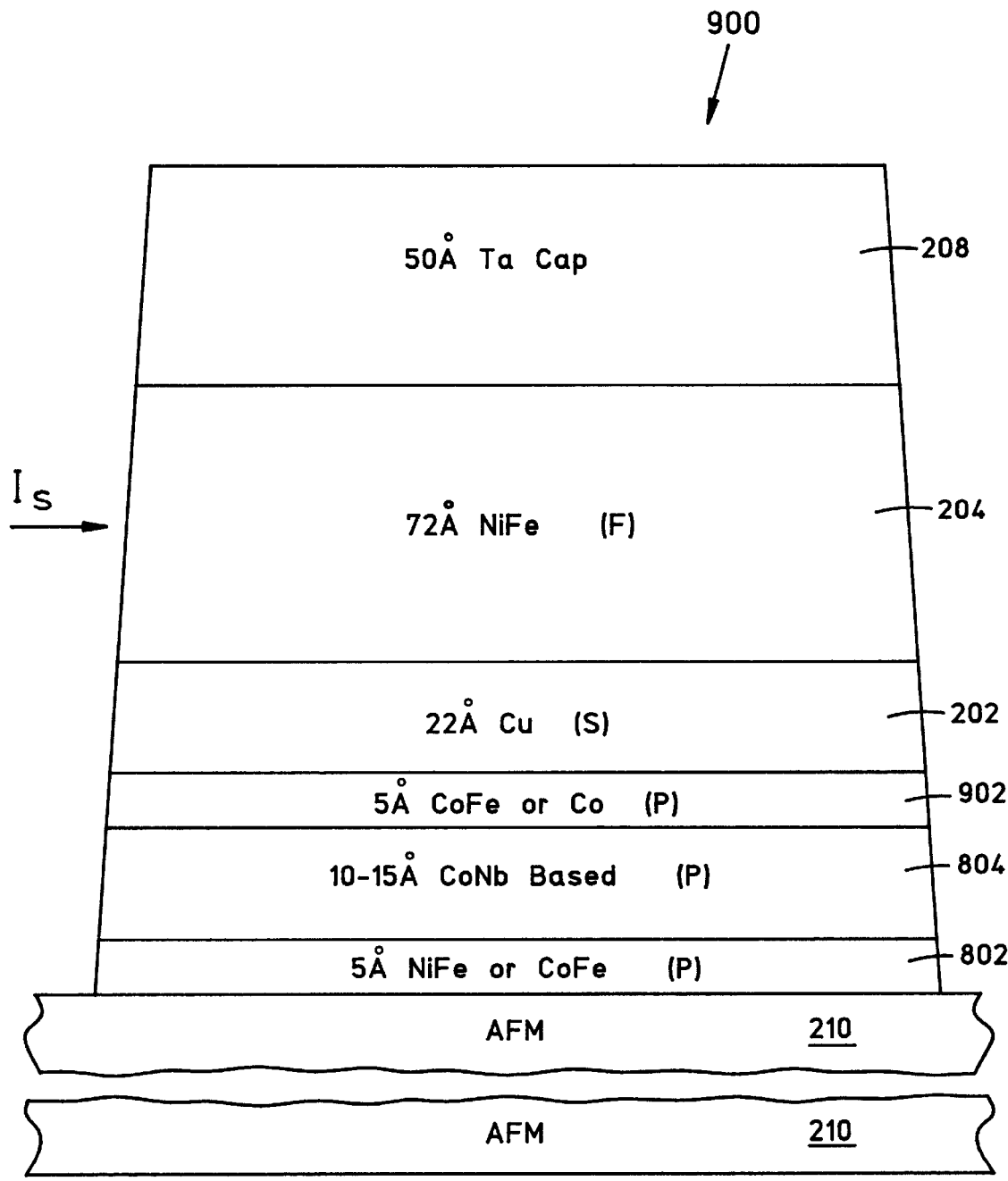
FIG. 19 is an ABS illustration of a simple pinned spin valve structure which is a seventh embodiment of the present invention.

A seventh embodiment of the present invention is illustrated by the spin valve sensor 900 in FIG. 19. This is the same as the spin valve sensor 800 in FIG. 18 except a third film 902 of the simple pinned layer is located between the second film 804 and the spacer layer 202. The third film 902 is composed of 5 Å of cobalt iron (CoFe) or cobalt (Co). This embodiment has an advantage in that cobalt iron (CoFe) or cobalt (Co) interfaces the copper (Cu) spacer layer 202 for enhancing the magnetoresistance of the spin valve sensor.

DISCUSSION

It should be understood that the various thicknesses given for the various layers are exemplary and can be modified as desired in order to obtain sought for results. In all embodiments a cobalt niobium (CoNb) based material is employed for a pinned structure, whether it be a simple pinned structure or an AP pinned structure. Further, the cobalt niobium (CoNb) based material is employed along with other material layers which still further enhance the magnetoresistance of the spin valve sensor.

Clearly, other embodiments and modifications of this invention will occur readily to those of ordinary skill in the art in view of these teachings. Therefore, this invention is to be limited only by following claims, which include all such embodiments and modifications when viewed in conjunction with the above specification and accompanying drawings.

I claim:

1. A magnetic read head comprising:
   a spin valve sensor that includes:
      a ferromagnetic free layer structure having a magnetic moment that is free to rotate in response to signal fields;
      a ferromagnetic pinned layer structure that has a magnetic moment;
      a nonmagnetic conductive spacer layer located between the free and pinned layer structures;
      an antiferromagnetic pinning layer exchange coupled to the pinned layer structure for pinning the magnetic moment of the pinned layer structure;
      the pinned layer structure including first and second layers wherein the first layer is cobalt (Co) or cobalt iron (CoFe) and the second layer is amorphous cobalt niobium (CoNb) based.

2. A magnetic read head as claimed in claim 1 further comprising:
   nonmagnetic nonconductive first and second read gap layers;
   the spin valve sensor being located between the first and second read gap layers;
   ferromagnetic first and second shield layers; and
   the first and second read gap layers being located between the first and second shield layers.

3. A magnetic read head as claimed in claim 2 wherein said second layer is cobalt iron niobium (CoFeNb).

4. A magnetic read head as claimed in claim 3 wherein the first layer interfaces the spacer layer.

5. A magnetic read head as claimed in claim 2 including:
   the ferromagnetic pinned layer structure including a third layer selected from the group consisting of nickel iron (NiFe), cobalt (Co) and cobalt iron (CoFe); and
   the third layer interfacing the antiferromagnetic pinning layer.

6. A magnetic read head comprising:
   a spin valve sensor that includes:
      a ferromagnetic free layer structure having a magnetic moment that is free to rotate in response to signal fields;
      an antiparallel (AP) pinned layer structure that has a magnetic moment;
      a nonmagnetic conductive spacer layer located between the free and AP pinned layer structures;
      an antiferromagnetic pinning layer exchange coupled to the AP pinned layer structure for pinning the magnetic moment of the AP pinned layer structure;
      the AP pinned layer structure including:
      ferromagnetic first and second AP pinned layers,
      an AP coupling layer located between the first and second AP pinned layers;
      the second AP pinned layer being located between the AP coupling layer and the spacer layer; and
      each of the first and second AP pinned layers including a cobalt niobium (CoNb) based first film and a cobalt (Co) or cobalt iron (CoFe) second film.

7. A magnetic read head as claimed in claim 6 including:
   the second film of the first AP pinned layer interfacing the pinning layer and the second film of the second AP pinned layer interfacing the spacer layer.

8. A magnetic read head as claimed in claim 7 including:
   each of the first and second AP pinned layers further including a cobalt (Co) or cobalt iron (CoFe) third film;
   the first film of each of the first and second AP pinned layers being located between the third and second films of each of the first and second AP pinned layers; and
   the third film of each of the first and second AP pinned layers interfacing the AP coupling layer.

9. A magnetic head assembly having a read head and a write head comprising:
   the write head including:
      ferromagnetic first and second pole piece layers;
      each of the first and second pole piece layers having a yoke portion located between a pole tip portion and a back gap portion;
      a nonmagnetic write gap layer located between the pole tip portions of the first and second pole piece layers;
      an insulation stack with at least one coil layer embedded therein located between the yoke portions of the first and second pole piece layers; and the first and second pole piece layers being connected at their back gap portions; and the read head including:
a spin valve sensor;
nonmagnetic nonconductive first and second read gap layers;
the spin valve sensor being located between the first and second read gap layers;
a ferromagnetic first shield layer; and
the first and second read gap layers being located between the first shield layer and the first pole piece layer; and the spin valve sensor including:
a ferromagnetic free layer structure having a magnetic moment that is free to rotate in response to signal fields;
an antiparallel (AP) pinned layer structure that has a magnetic moment;
a nonmagnetic conductive spacer layer located between the free and AP pinned layer structures;
an antiferromagnetic pinning layer exchange coupled to the AP pinned layer structure for pinning the magnetic moment of the AP pinned layer structure;
the AP pinned layer structure including:
ferromagnetic first and second AP pinned layers;
an AP coupling layer located between the first and second AP pinned layers;
the second AP pinned layer being located between the AP coupling layer and the spacer layer; and
each of the first and second AP pinned layers including a cobalt niobium (CoNb) based first film and a nickel iron (NiFe), cobalt (Co) or cobalt iron (CoFe) second film.

10. A magnetic head assembly as claimed in claim 9 wherein the read head further includes:
a ferromagnetic second shield layer;
a nonmagnetic separation layer; and
the nonmagnetic separation layer being located between the second shield layer the first pole piece layer.

11. A magnetic head assembly as claimed in claim 9 including:
the second film of the first AP pinned layer interfacing the pinning layer and the second film of the second AP pinned layer interfacing the spacer layer.

12. A magnetic head assembly as claimed in claim 11 including:
each of the first and second AP pinned layers further including a cobalt (Co) or cobalt iron (CoFe) third film;
the first film of each of the first and second AP pinned layers being located between the third and second films of each of the first and second AP pinned layers; and
the third film of each of the first and second AP pinned layers interfacing the AP coupling layer.

13. A magnetic disk drive having at least one slider that has an air bearing surface (ABS), the slider supporting at least one magnetic head assembly that includes a read head and a write head, the disk drive comprising:
the write head including:
ferromagnetic first and second pole piece layers;
each of the first and second pole piece layers having a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions; and the read head including:
a spin valve sensor;
nonmagnetic nonconductive first and second read gap layers; the spin valve sensor being located between the first and second read gap layers;
a ferromagnetic first shield layer; and
the first and second read gap layers being located between the first shield layer and the first pole piece layer; and the spin valve sensor including:
a ferromagnetic free layer structure having a magnetic moment that is free to rotate in response to signal fields;
an antiparallel (AP) pinned layer structure that has a magnetic moment;
a nonmagnetic conductive spacer layer located between the free and AP pinned layer structures;
an antiferromagnetic pinning layer exchange coupled to the AP pinned layer structure for pinning the magnetic moment of the AP pinned layer structure;
the AP pinned layer structure including:
ferromagnetic first and second AP pinned layers;
an AP coupling layer located between the first and second AP pinned layers;
the second AP pinned layer being located between the AP coupling layer and the spacer layer; and
each of the first and second AP pinned layers including a cobalt niobium (CoNb) based first film and a nickel iron (NiFe), cobalt (Co) or cobalt iron (CoFe) second film;

a housing;
a magnetic disk rotatably supported in the housing;
a support mounted in the housing for supporting the magnetic head assembly with its ABS facing the magnetic disk so that the magnetic head assembly is in a transducing relationship with the magnetic disk;
a spindle motor for rotating the magnetic disk;
an actuator connected to the support for moving the magnetic head assembly to multiple positions with respect to said magnetic disk; and
a processor connected to the magnetic head assembly, to the spindle motor and to the actuator for exchanging signals with the magnetic head assembly, for controlling rotation of the magnetic disk and for controlling the position of the magnetic head assembly relative to the magnetic disk.

14. A magnetic disk drive as claimed in claim 13 wherein the read head further includes:
a ferromagnetic second shield layer;
a nonmagnetic separation layer; and
the nonmagnetic separation layer being located between the second shield layer the first pole piece layer.

15. A magnetic disk drive as claimed in claim 13 including:
the second film of the first AP pinned layer interfacing the pinning layer and the second film of the second AP pinned layer interfacing the spacer layer.

16. A magnetic disk drive as claimed in claim 15 including:
each of the first and second AP pinned layers further including a cobalt (Co) or cobalt iron (CoFe) third film;
the first film of each of the first and second AP pinned layers being located between the third and second films of each of the first and second AP pinned layers; and
the third film of each of the first and second AP pinned layers interfacing the AP coupling layer.

17. A method of making a read head that includes a spin valve sensor comprising the steps of:

a making of the spin valve sensor comprising the steps of:
   forming a ferromagnetic free layer structure having a magnetic moment that is free to rotate in response to signal fields;
   forming a ferromagnetic pinned layer structure that has a magnetic moment;
   forming a nonmagnetic conductive spacer layer between the free and pinned layer structures;
   forming an antiferromagnetic pinning layer exchange coupled to the pinned layer structure for pinning the magnetic moment of the pinned layer structure;
   forming the pinned layer structure with first and second layers wherein the first layer is cobalt (Co) or cobalt iron (CoFe) and the second layer is amorphous cobalt niobium (CoNb) based.

18. A method as claimed in claim 17 further comprising the steps of:
   forming nonmagnetic nonconductive first and second read gap layers with the spin valve sensor located therebetween; and
   forming ferromagnetic first and second shield layers with the first and second read gap layers located therebetween.

19. A method as claimed in claim 18 wherein said second layer is cobalt iron niobium (CoFeNb).

20. A method as claimed in claim 19 wherein the first layer is formed interfacing the spacer layer.

21. A method as claimed in claim 18 further including the steps of:
   forming the pinned layer structure with a nickel iron (NiFe), cobalt (Co) or cobalt iron (CoFe) third layer which interfaces the pinning layer.

22. A method of making a magnetic read head comprising the steps of:
   making a spin valve sensor including the steps of:
      forming a ferromagnetic free layer structure having a magnetic moment that is free to rotate in response to signal fields;
      forming an antiparallel (AP) pinned layer structure that has a magnetic moment;
      forming a nonmagnetic conductive spacer layer between the free and AP pinned layer structures;
      forming an antiferromagnetic pinning layer exchange coupled to the AP pinned layer structure for pinning the magnetic moment of the AP pinned layer structure; making the AP pinned layer structure including the steps of:
         forming ferromagnetic first and second AP pinned layers;
         forming an AP coupling layer between the first and second AP pinned layers with the second AP pinned layer located between the AP coupling layer and the spacer layer; and
         forming each of the first and second AP pinned layers with a cobalt niobium (CoNb) based first film and a cobalt (Co) or cobalt iron (CoFe) second film.

23. A method as claimed in claim 22 further including the steps of:
   forming the second film of the first AP pinned layer interfacing the pinning layer and forming the second film of the second AP pinned layer interfacing the spacer layer.

24. A method as claimed in claim 23 further including the steps of:
   forming each of the first and second AP pinned layers with a cobalt (Co) or cobalt iron (CoFe) third film;
   forming the first film of each of the first and second AP pinned layers between the third and second films of each of the first and second AP pinned layers; and
   forming the third film of each of the first and second AP pinned layers interfacing the AP coupling layer.

25. A method of making a magnetic head assembly having a read head and a write head comprising the steps of:
   a forming of the write head comprising the steps of:
      forming ferromagnetic first and second pole piece layers with a yoke portion between a pole tip portion and a back gap portion;
      forming a nonmagnetic write gap layer between the pole tip portions of the first and second pole piece layers;
      forming an insulation stack with at least one coil layer embedded therein in the yoke portions of the first and second pole piece layers; and
      connecting the first and second pole piece layers at their back gaps portions; and a forming of the read head comprising the steps of:
      forming nonmagnetic nonconductive first and second read gap layers;
      forming a spin valve sensor between the first and second read gap layers;
      forming a ferromagnetic first shield layer; and
      forming the first and second read gap layers between the first shield layer and the first pole piece layer; and
   a making of the spin valve sensor comprising the steps of:
      forming a ferromagnetic free layer structure having a magnetic moment that is free to rotate in response to signal fields;
      forming an antiparallel (AP) pinned layer structure that has a magnetic moment;
      forming a nonmagnetic conductive spacer layer between the free and AP pinned layer structures;
      forming an antiferromagnetic pinning layer exchange coupled to the AP pinned layer structure for pinning the magnetic moment of the AP pinned layer structure; making the AP pinned layer structure including the steps of:
         forming ferromagnetic first and second AP pinned layers with an AP coupling layer located between the first and second AP pinned layers and with the second AP pinned layer being located between the AP coupling layer and the spacer layer; and
         forming each of the first and second AP pinned layers with a cobalt niobium (CoNb) based first film and a cobalt (Co) or cobalt iron (CoFe) second film.

26. A method as claimed in claim 25 further comprising the steps of:
   forming a ferromagnetic second shield layer between the second read gap layer and the first pole piece layer; and
   forming a nonmagnetic separation layer between the second shield layer the first pole piece layer.

27. A method as claimed in claim 25 further including the steps of:
   forming the second film of the first AP pinned layer interfacing the pinning layer and the second film of the second AP pinned layer interfacing the spacer layer.

28. A method as claimed in claim 27 further including the steps of:
   forming each of the first and second AP pinned layers with a cobalt (Co) or cobalt iron (CoFe) third film;
   forming the first film of each of the first and second AP pinned layers between the third and second films of each of the first and second AP pinned layers; and
   forming the third film of each of the first and second AP pinned layers interfacing the AP coupling layer.

* * * * *